United States Patent [19]

Silver

[11] Patent Number: 5,081,701
[45] Date of Patent: Jan. 14, 1992

[54] SYSTEM FOR CONTROLLING DATA TRANSFER USING TRANSFER HANDSHAKE PROTOCOL USING TRANSFER COMPLETE AND TRANSFER INHIBIT SIGNALS

[75] Inventor: Jordan R. Silver, San Jose, Calif.

[73] Assignee: Tandem Computers Incorporated, Cupertino, Calif.

[21] Appl. No.: 420,652

[22] Filed: Oct. 11, 1989

Related U.S. Application Data

[63] Continuation of Ser. No. 40,396, Apr. 20, 1987, abandoned.

[51] Int. Cl.⁵ .................... G06F 13/14; G06F 13/364
[52] U.S. Cl. .......................... 395/325; 364/240.8; 364/260; 364/935; 364/940.68; 364/DIG. 2
[58] Field of Search ... 364/200 MS File, 900 MS File

[56] References Cited

U.S. PATENT DOCUMENTS

| | | | |
|---|---|---|---|
| 3,400,372 | 2/1965 | Beausoleil et al. | 364/900 |
| 4,272,815 | 6/1981 | Kadowaki et al. | 364/200 |
| 4,283,760 | 8/1981 | Kita et al. | 364/200 |
| 4,371,928 | 2/1983 | Barlow et al. | 364/200 |
| 4,435,761 | 3/1984 | Kimoto | 364/200 |
| 4,455,608 | 6/1984 | Suzuki et al. | 364/200 |
| 4,467,419 | 8/1984 | Wakai | 364/200 |
| 4,542,457 | 9/1985 | Mortensen et al. | 364/200 |
| 4,571,674 | 2/1986 | Hatung et al. | 364/200 |
| 4,663,730 | 5/1987 | Ikeda | 364/900 |
| 4,837,785 | 6/1989 | McAlpine | 370/85.1 |
| 4,980,851 | 12/1990 | Komoni et al. | 364/900 |

FOREIGN PATENT DOCUMENTS

| 0228811 | 7/1987 | European Pat. Off. | 364/200 |
|---|---|---|---|
| 0262429 | 6/1988 | European Pat. Off. | 364/200 |

Primary Examiner—Thomas C. Lee
Assistant Examiner—Ayni Mohamed
Attorney, Agent, or Firm—Townsend and Townsend

[57] ABSTRACT

A circuit for controlling data transfer handshake protocol so that certain protocol events may occur prior to or simultaneously with the completion of a proceeding protocol event, and the ultimate results of the pending protocol event may be determined at a later time. In one embodiment of the invention a CPU operates to transfer data (either receive or send) between itself and an I/O channel every five processor clock cycles. At the beginning of each set of five clock cycles the CPU places data on the data bus and generates a transfer request (CPU-XFR) signal whenever it receives a data accepted (DATA-ACC) signal indicating that a previous data transfer has occurred. The CPU-XFR signal is generated regardless of whether or not the previous data transfer is complete at the time. The data transfer normally is completed one clock cycle after the CPU-XFR signal is generated, and at that time a transfer complete signal is generated. If the transfer complete signal is not generated, a transfer inhibits signal is generated for inhibiting the generation of the succeeding DATA-ACC signal and hence the next CPU-XFR signal.

9 Claims, 4 Drawing Sheets

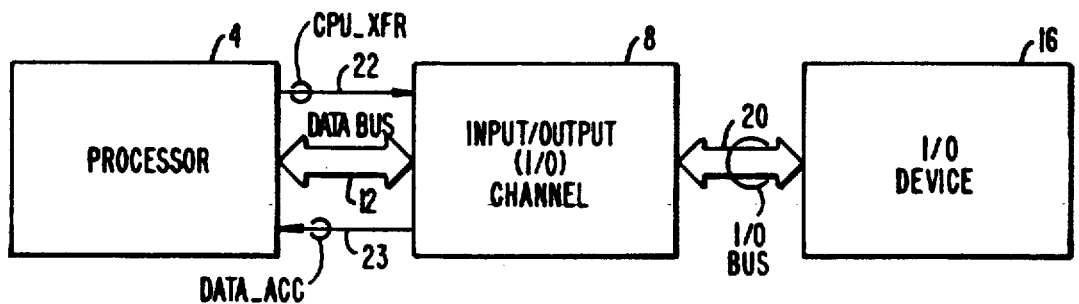
FIG._1.
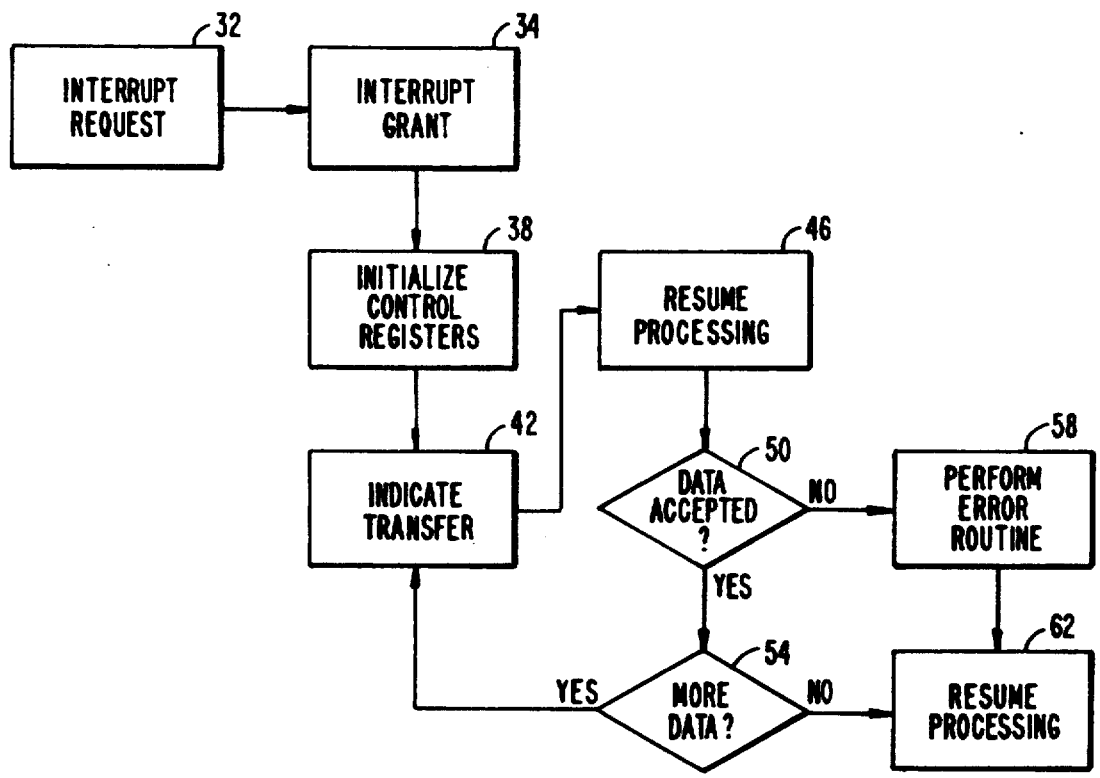
FIG._2.

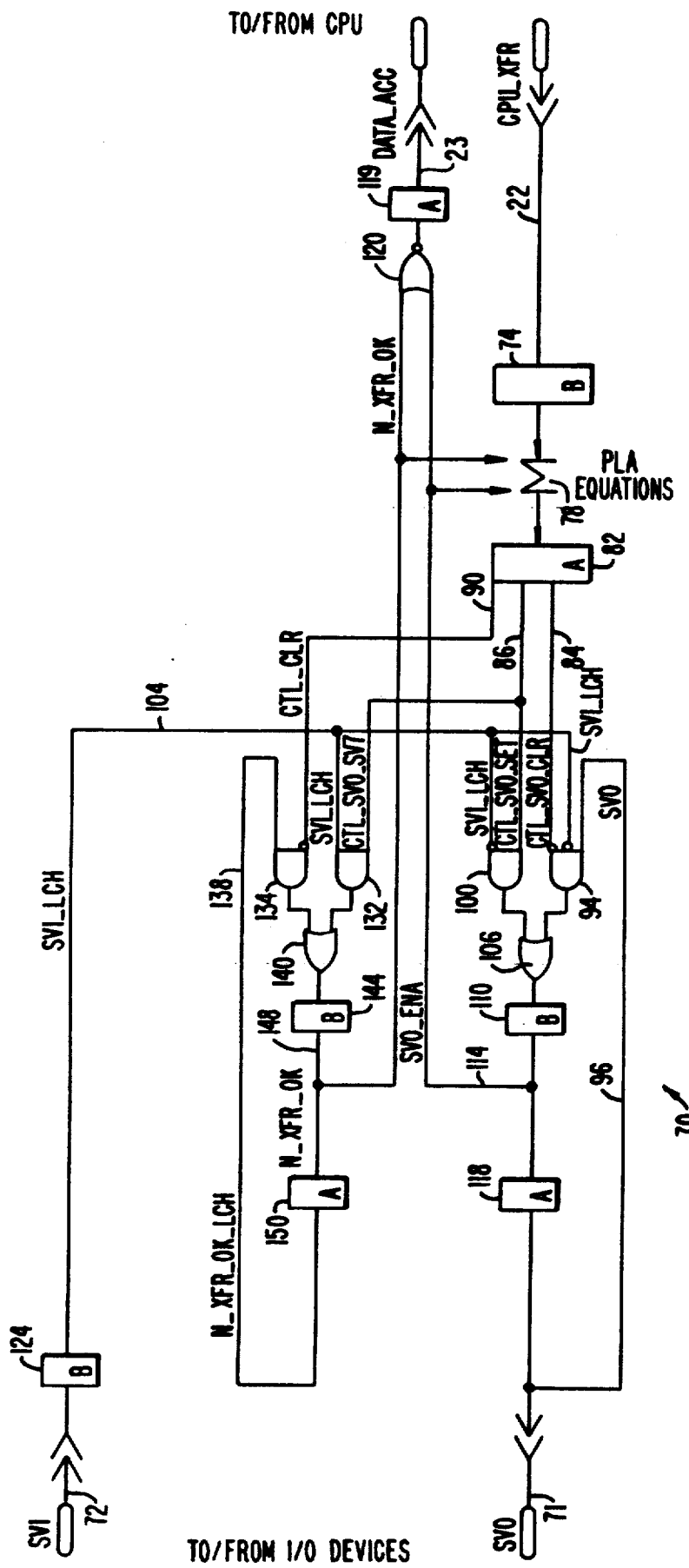

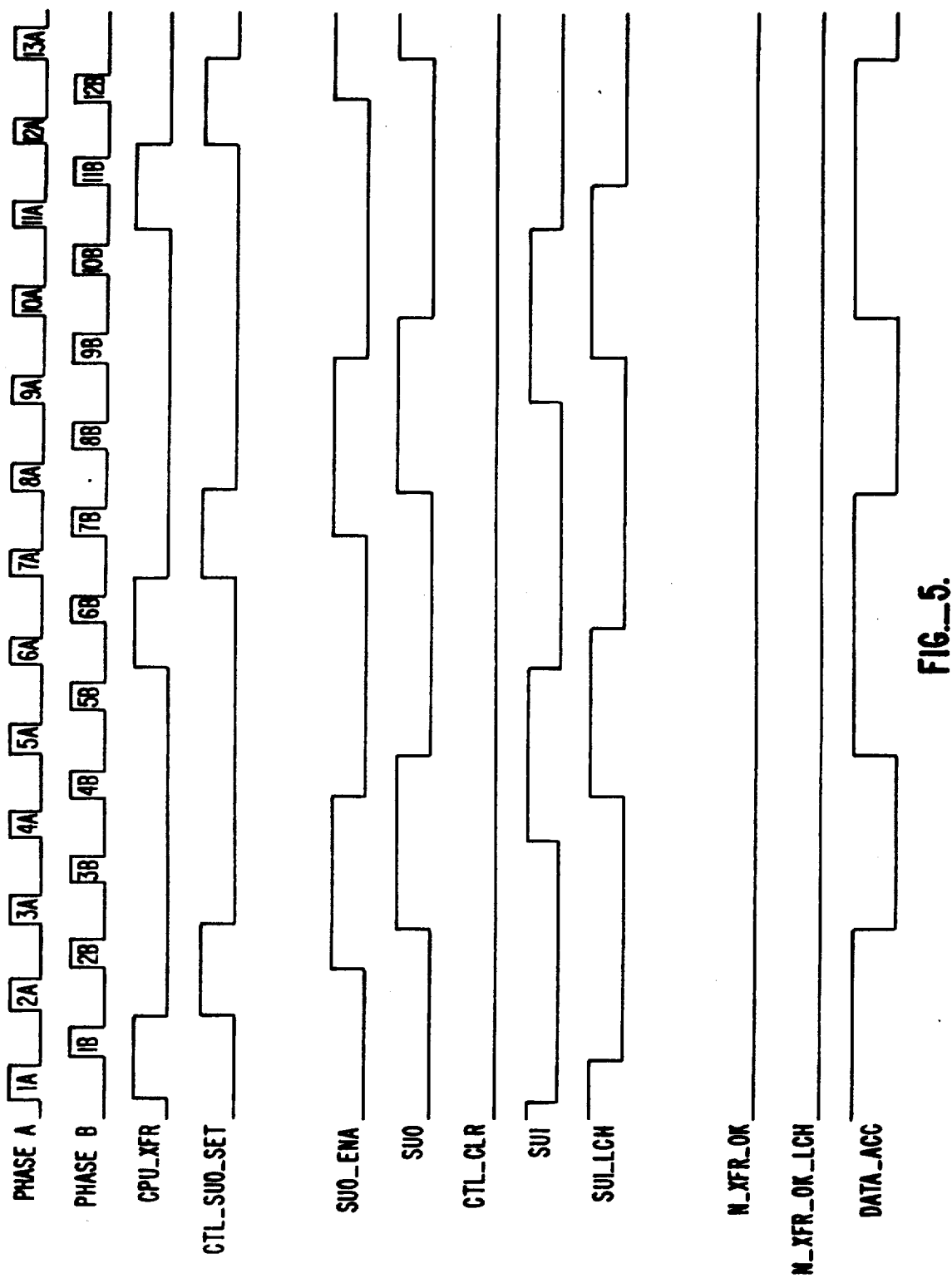
FIG._5.

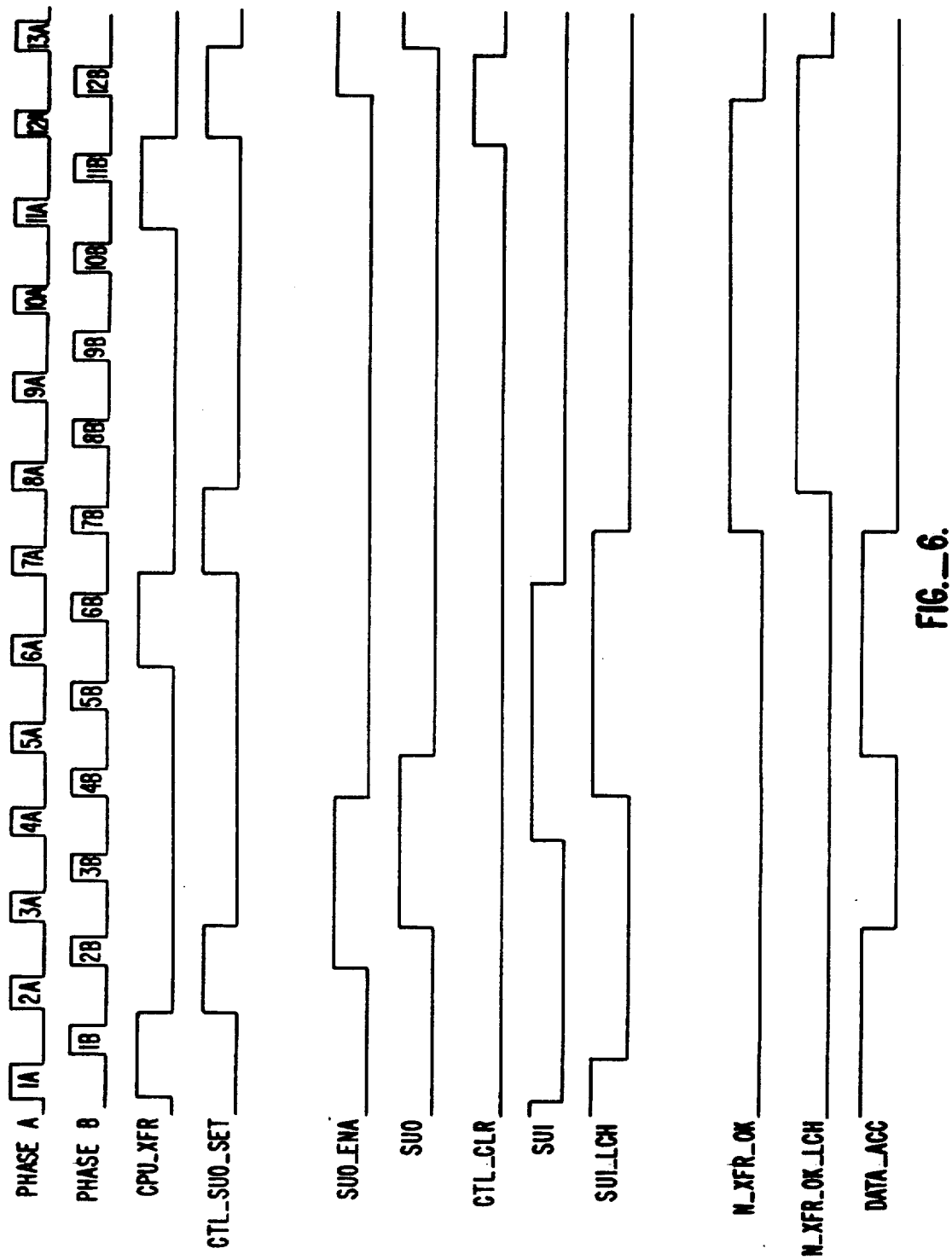
FIG._6.

1

SYSTEM FOR CONTROLLING DATA TRANSFER USING TRANSFER HANDSHAKE PROTOCOL USING TRANSFER COMPLETE AND TRANSFER INHIBIT SIGNALS

This is a continuation of application Ser. No. 07/040,396, filed Apr. 20, 1987, now abandoned.

BACKGROUND OF THE INVENTION

1. Field of the Invention

The present invention relates to data processing systems and more particularly to a method and apparatus for controlling data transfers between first and second information processing elements within a data processing system.

2. Description of the Relevant Art

Data transfers frequently are initiated by a first or a second information processing element, such as a central processing unit (CPU) or an I/O channel, by one information processing element signaling the other that a data transfer is requested. The device which receives the request then signals that it is ready to make the transfer, the transfer occurs, and the requesting device sends an acknowledgment of completion of the transfer. Finally, the device which received the request for transfer acknowledges that its operation is also complete. Although this is an effective serial "handshake" method for controlling the transfer of data between two information processing elements, the sending device must await the acknowledgment from the receiving device before it attempts another transfer. This wastes time, especially when the sending device must perform other tasks and may be busy when the acknowledgment occurs.

SUMMARY OF THE INVENTION

The present invention is directed to an apparatus for controlling data transfer handshake protocol so that certain protocol events may occur prior to or simultaneously with the completion of a preceding protocol event, and the ultimate result of the pending protocol event may be determined at a later time. In one embodiment of the present invention directed to data transfers between a central processing unit and an I/O channel, the CPU operates to transfer data (either receive or send) between itself and the I/O channel every five processor clock cycles. At the beginning of each set of five clock cycles, the CPU places data on the data bus (or, if receiving data, assumes data is on the data bus) and generates a transfer request (CPU-XFR) signal. If it receives a data accepted (DATA-ACC) signal it anticipates that a previous data transfer has completed. The CPU-XFR signal is generated regardless of whether or not the previous data transfer actually is complete at the time.

In the embodiment described the previous data transfer normally is completed one clock cycle after the transfer request signal is generated, and at that time a transfer complete signal is generated. If the transfer complete signal is not generated a transfer inhibit signal is generated for inhibiting the generation of the succeeding DATA-ACC signal (and hence the next CPU-XFR signal) so that the CPU may determine the cause of noncompletion and either abort or retry the previously attempted data transfer.

BRIEF DESCRIPTION OF THE DRAWINGS

FIG. 1 is a block diagram of a CPU and I/O channel according to the present invention.

FIG. 2 is a flowchart illustrating data transfer protocol according to the present invention.

FIG. 3 is a schematic diagram of a circuit for controlling data transfers according to the present invention.

FIG. 4 is a diagram illustrating Phase A and Phase B pulses used with the circuit of FIG. 2.

FIG. 5 is a timing diagram illustrating normal operation of the apparatus of FIG. 2.

FIG. 6 is a timing diagram illustrating operation of the circuit of FIG. 2 when a data transfer is inhibited.

DETAILED DESCRIPTION OF THE PREFERRED EMBODIMENTS

FIG. 1 is a block diagram of an apparatus according to the present invention wherein data is transferred between a CPU 4 and an I/O channel 8 over a data bus 12. Data in turn is transferred between I/O channel 8 and an I/O device 16 through an I/O bus 20. For controlling data transfer between CPU 4 and I/O channel 8, CPU 4 communicates a transfer request (CPU-XFR) signal to I/O channel over a line 22, and I/O channel 8 communicates a data accepted (DATA-ACC) signal to CPU 4 over a line 23.

FIG. 2 illustrates the normal sequence of operation when CPU 4 transfers data to or from I/O channel 8. As shown in FIG. 2, I/O channel 8 requests an interrupt from CPU 4 in a step 32, and CPU 4 grants the interrupt in a step 34. Following the interrupt grant, CPU 4 initializes the appropriate control registers in the I/O channel 8 in a step 38. CPU 4 then places a block of data to be transferred on data bus 12 and makes a transfer request in a step 42. At this time the CPU resumes other tasks in a step 46 until it is time to perform the next transfer in the sequence. In this embodiment a transfer is attempted after every five processors clock cycles. If it is ascertained in a step 50 that the data transfer has been accepted by the I/O channel (which indicates that another transfer may proceed), and if it is ascertained in a step 54 that there is more data to transfer, then the CPU 4 places the next block of data on data bus 12 and indicates that a transfer is to occur in step 42. If it was ascertained in step 50 that data was not accepted by the I/O channel, then CPU 4 performs an error routine designated for the situation in a step 58. At this time CPU 4 may abort the data transfer operation, retry the previous transfer, or proceed with a new transfer. After the error routine is performed and/or after there is no more data to transfer, processing resumes in a step 62.

FIG. 3 is a schematic diagram of a control circuit 70 according to the present invention. Circuit 70 preferably is located within I/O channel 8, although that is not necessary. Circuit 70 receives the CPU-XFR signal from CPU 4 on line 22 indicating that a transfer is to occur, and CPU 4 receives a DATA-ACC signal on line 23 indicating whether or not the previous transfer was successful. Additionally, circuit 70 generates well known service out (SVO) signals to the I/O devices over line 71 and receives well known service in (SVI) signals from the I/O devices on a line 72.

In the discussion which follows, a "Phase A" latch is a conventional latch which is enabled by the positive or high-going portion of the Phase A pulse train illustrated in FIG. 4. Similarly, a "Phase B" latch is a conventional latch which is enabled by the positive or high going portion of the Phase B pulse train illustrated in FIG. 4. The Phase A and Phase B pulse trains may comprise any set of interleaved and nonoverlapping pulse trains wherein each Phase A positive pulse alternates with each Phase B positive pulse.

Circuit 70 receives the CPU-XFR signal and stores the signal in a Phase B latch 74 which in turn communicates the signal to a programmed logic array 78 for decoding. In the preferred embodiment, the CPU-XFR signal is actually several unique decodings of a larger set of coded control signals received from CPU 4. The decoded signal then is communicated to a Phase A latch 82 for producing a CTL-SVO-CLR signal on line 84, a CTL-SVO-SET signal on line 86, and a CTL-CLR signal on line 90. The CTL-SVO-CLR signal may be used for clearing the SVO signal when CPU 4 issues a transfer request which does not require a handshake, or when for some other reason I/O device 8 does not respond with an SVI signal.

The CTL-SVO-CLR signal is communicated to an inverting input terminal of an AND gate 94 as is the SVI-LCH signal on line 104, and the noninverting input terminal of AND gate 94 is connected for receiving an SVO signal on a line 96. The CTL-SVO-SET signal is communicated to the noninverting input terminal of an AND gate 100. The inverting input terminal of AND gate 100 is connected for receiving an SVI-LCH signal on a line 104 for reasons discussed below. The signals from AND gates 94 and 100 are communicated to an OR gate 106 the output terminal of which is connected to a Phase B latch 110. Phase B latch 110 communicates an SVO-ENA signal on a line 114 to a Phase A latch 118, to a NOR gate 120 and to program logic array 78. Phase A latch 118 communicates the SVO-ENA signal as an SVO signal to AND gate 94 on line 96 and to I/O devices 16 on line 71.

Circuit 70 receives an SVI signal from I/O devices 16 on line 72 wherein it is stored in a Phase B latch 124. Phase B latch 124 in turn communicates the SVI signal as an SVI-LCH signal on line 104. The SVI-LCH signal is communicated to the noninverting input terminal of AND gate 100, to an inverting input terminal of AND gate 94, and to one of the input terminals of an AND gate 132. The other input terminal of AND gate 132 is connected for receiving the CTL-SVO-SET signal from line 86.

Another AND gate 134 has its inverting input connected for receiving the CTL-CLR signal from line 90. The noninverting input of AND gate 134 receives an N-XFR-OK-LCH signal on a line 138. The output terminals from AND gates 132 and 134 are connected to the input terminals of an OR gate 140 which in turn has its output terminal connected to a Phase B latch 144. Phase B latch 144 communicates the signals so received as an N-XFR-OK signal on a line 148 to a Phase A latch 150, to NOR gate 120 and to program logic array 78. Phase A latch 150 communicates the N-XFR-OK signal to AND gate 134 as N-XFR-OK-LCH on line 138.

Normal operation of circuit 70 may be understood by referring to FIGS. 3 and 5. Circuit 70 receives the CPU-XFR signal on line 22 and, if DATA-ACC is high (indicating the previous transfer was successful). CPU-XFR is decoded to produce a high CTL-SVO-SET signal on line 86 at the leading edge of pulse 2A. Since the SVI-LCH signal on line 104 ordinarily is low at this time, a high signal appears at the output of AND gate 100 which is communicated through OR gate 106 and to the input terminal of Phase B latch 110. At the leading edge of pulse 2B. the high signal from OR gate 106 is communicated to line 114 as a high SVO-ENA signal. At the leading edge of pulse 3A. the high SVO-ENA signal appears as a high SVO signal on lines 71 and 96 and as a low DATA-ACC signal on line 23. The high SVO signal on line 96 is fed back to AND gate 94 which at this time is receiving a low signal from CTL-SVO-CLR on line 84, and a low SVI-LCH signal on line 104, and the resulting high signal at the output terminal of AND gate 94 is communicated through OR gate 106 and to the input of Phase B latch 110, thus maintaining the present state of the SVO-ENA, SVO and DATA-ACC signals. At the leading edge of pulse 4A, a high SVI signal should appear on line 72. The SVI signal appears as a high SVI-LCH signal at the leading edge of pulse 4B. The SVI-LCH signal is communicated to AND gates 94, 100 and 132. The high SVI-LCH signal applied to AND gate 100 prevents SVO from being set by CTL-SVO-SET should this signal go high. Since CTL-SVO-SET is now low, the high SVI-LCH signal has no effect on AND gate 132 and the N-XFR-OK signal on line 148 remains low.

The high SVI-LCH signal produced at the leading edge of pulse 4B. as described above, is used also for clearing the SVO signal. The high SVI-LCH signal on line 104 disables AND gate 94, and the low signal appearing at the output terminal of AND gate 94 is communicated through OR gate 106 and then to the input of Phase B latch 110. Accordingly, at the leading edge of pulse 4B. SVO-ENA goes low, and this low signal is communicated at the leading edge of pulse 5A as a high DATA-ACC signal on line 23 and a low SVO signal on lines 71 and 96. The high DATA-ACC signal on line 23 indicates that the transfer has occurred (although it has not yet completed). Since DATA-ACC indicates that a transfer has occurred, CPU 4 will anticipate transfer completion during the next transfer request at the leading edge of pulse 6A. At the same time, the SVI signal on line 72 should go low. The low SVI signal is communicated through Phase B latch 124 so that a low SVI-LCH signal appears on line 104 at the leading edge of pulse 6B. At this time the high CTL-SVO-SET signal also should appear on line 86. This combination of signals at the input terminals of AND gate 100 produces a high signal which is communicated through OR gate 106 and Phase B latch 110 to appear as a high SVO-ENA signal 114 at the leading edge of pulse 7B. The high SVO-ENA signal is communicated through Phase A latches 118 and 119, and the operation proceeds as described above.

FIG. 6 is a timing diagram representing the operation of circuit 70 when a data transfer is inhibited. In FIG. 6, processing proceeds as in FIG. 5 and CPU 4 attempts another data transfer at the leading edge of pulse 6 A. However, the previous data transfer has not completed and the SVI signal did not go low at the leading edge of pulse 6A, possibly as a result of error correction steps taken by the controller, etc.. Consequently, a high SVI-LCH signal remains on line 104 at the leading edge of pulse 7A thus rendering AND gate 100 unresponsive to the high CTL-SVO-SET signal appearing on line 86. As a result. SVO-ENA and SVO remain low. At the same time, the high SVI-LCH signal coupled with the high CTL-SVO-SET signal at the input terminals of AND gate 132 produce a high signal which is propagated through OR gate 140 and to the input terminal of Phase B latch 144. At the leading edge of pulse 7B, a high N-XFR-OK signal appears on line 148, and this signal is communicated to NOR gate 120 and Phase A latch 150. At the leading edge of pulse 8A, the high N-XFR-OK-LCH signal appears on line 138 and the high N-XFR-OK signal appears as a low DATA-ACC signal on line 23. The high N-XFR-OK-LCH signal on line 138 coupled with the low CTL-CLR signal on line 90 produce a high signal at the output terminal of AND gate 134 for maintaining the high N-XFR-OK signal on line 148. Thus, when the CPU detects the low DATA-ACC signal on line 23 at the leading edge of pulse 11A, it knows that a previous data transfer was not completed properly. The CPU then may perform an error routine and either abort or retry the previous transfer or proceed with the next transfer. After the error is resolved, CPU 4 issues a CPU-XFR signal which sets CTL-CLR high to clear the high N-XFR-OK and N-XFR-OKLCH signals. Processing then resumes as under normal operation.

While the above is a complete description of a preferred embodiment of the present invention, various modifications are obvious to those skilled in the art. Consequently, the scope of the invention should not be limited except as properly described in the claims.

We claim:

1. An apparatus for controlling data transfer from a first information processing element to a second information processing element comprising:

request receiving means, coupled to the first information processing element, for receiving a transfer request signal therefrom;

SVO signal generating means, coupled to the request receiving means, for generating a first SVO signal to the second information processing element in response to the transfer request signal;

data accept signal means, coupled to the SVO signal generating means, for generating a first data accept signal in response to the first SVO signal;

SVI signal receiving means, coupled to the second information processing element, for receiving a first SVI signal from the second information processing element, corresponding to the transfer request signal, for indicating that a data transfer has occurred and for receiving a second SVI signal, corresponding to the transfer request signal, from the second information processing element when the data transfer is complete;

SVO reset means, coupled to the SVI signal receiving means and to the SVO signal generating means, for causing the SVO signal generating means to generate a second SVO signal in response to the first SVI signal;

wherein the data accept signal means generates a second data accept signal in response to the second SVO signal; and SVO inhibiting means, coupled to the SVO signal generating means and to the SVI signal receiving means, for inhibiting the SVO generating means from generating a succeeding first SVO signal in response to a subsequent transfer request signal when the second SVI signal has not been received by the SVO inhibiting means.

2. The apparatus according to claim 1 further comprising data accept inhibit means, coupled to the data accept signal means and to the SVI signal receiving means, for causing the data accept signal means to generate the first data accept signal when a subsequent transfer request signal has been received by the request receiving means and the second SVI signal has not been received by the SVI signal receiving means.

3. The apparatus according to claim 1 wherein, for any integer N greater than zero, the transfer request signal normally is generated at N clock cycles after a preceding transfer request signal is generated and wherein, for any integer M greater than zero, the transfer inhibit means inhibits the generation of the succeeding transfer indication signal when the previous data transfer did not complete within M clock cycles after the generation of the preceding transfer request signal.

4. The apparatus according to claim 3 wherein $M = 1$.

5. A method for controlling data transfer from a first information processing element to a second information processing element comprising the steps of:

generating a first SVO signal to the second information processing element in response to a transfer request signal received from the first information processing element;

generating a first data accept signal in response to the first SVO signal;

receiving a first SVI signal, corresponding to the transfer request signal, from the second information processing element indicating that a data transfer has occurred;

generating a second SVO signal in response to the first SVI signal;

generating a second data accept signal in response to the second SVO signal;

receiving a second SVI signal, corresponding to the transfer request signal, from the second information processing element when the data transfer is complete; and inhibiting the SVO generating means from generating a succeeding first SVO signal in response to a subsequent transfer request signal when the second SVI signal has not been received by the SVO inhibiting means.

6. The method according to claim 5 further comprising the step of generating the first data accept signal when a subsequent transfer request signal has been received and the second SVI signal has not been received.

7. The method according to claim 5 further comprising the step of, for any integer N greater than zero, receiving the subsequent transfer request signal N clock cycles after receiving the transfer request signal.

8. The method according to claim 7 wherein the SVO generating means inhibiting step further comprises the step of, for any integer M greater than zero, inhibiting the SVO generating means from generating the succeeding first SVO signal when the data transfer did not complete within M clock cycles after the generation of the transfer request signal.

9. The method according to claim 8 wherein $M = N$.

* * * * *